March 11, 1969     J. E. LAMY     3,431,740
SUBMARINE CONDUIT AND METHOD OF LAYING THE SAME
Filed Nov. 10, 1966     Sheet _1_ of 2

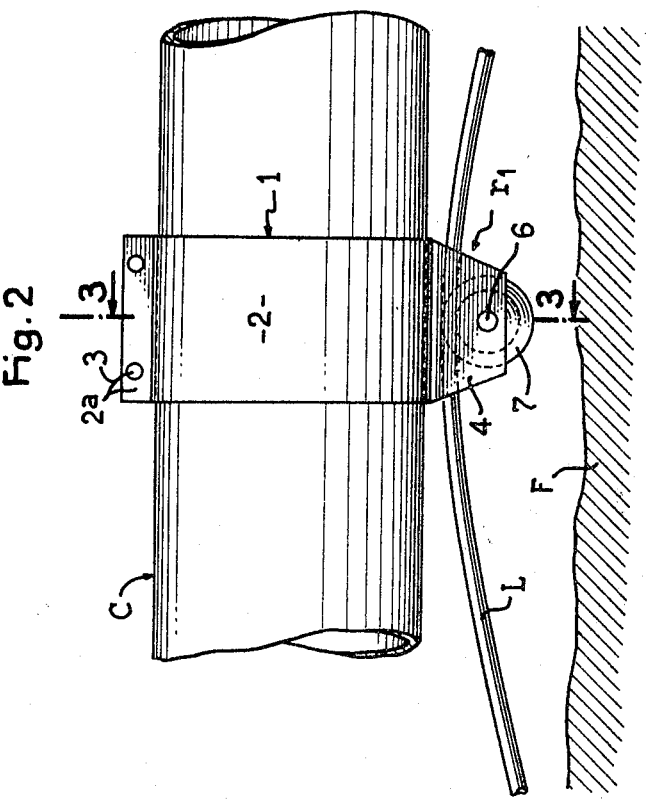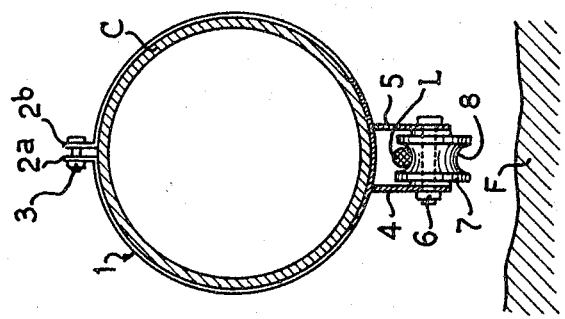

United States Patent Office 3,431,740
Patented Mar. 11, 1969

---

3,431,740
SUBMARINE CONDUIT AND METHOD
OF LAYING THE SAME
Jacques Edouard Lamy, Fontenay-aux-Roses, France, assignor to Societe d'Etude du Transport et de la Valorisation des Gaz Naturels du Sahara S.E.G.A.N.S., Paris, France, a French body corporate
Filed Nov. 10, 1966, Ser. No. 593,472
Claims priority, application France, Nov. 10, 1965, 37,900
U.S. Cl. 61—72.4                6 Claims
Int. Cl. B63b 35/04; F16l 1/00

ABSTRACT OF THE DISCLOSURE

Method for laying relatively heavy conduits on a bed underlying a body of water, such as the sea bed, the conduit having the buoyancy comprising a relatively heavy cable on said bed, said cable having a rear part on an assembly site and a forward part remote from said assembly site and located at a point in the direction of which said conduit is intended to extend from said assembly site. On that site, rolling devices are fixed on said conduit in spaced relation to each other, while said cable is interposed between said rolling devices and said conduit. In that manner, the rolling devices can roll along said cable by effecting a traction on the forward end of said conduit in the direction of the forward part of the cable so that the conduit is guided by said cable as it is being laid. In one embodiment, scrapers are drawn along said cable fixed between a traction cable and the end of the conduit, so as to form a trench wherein the cable and the conduit are laid.

---

Figure 1:
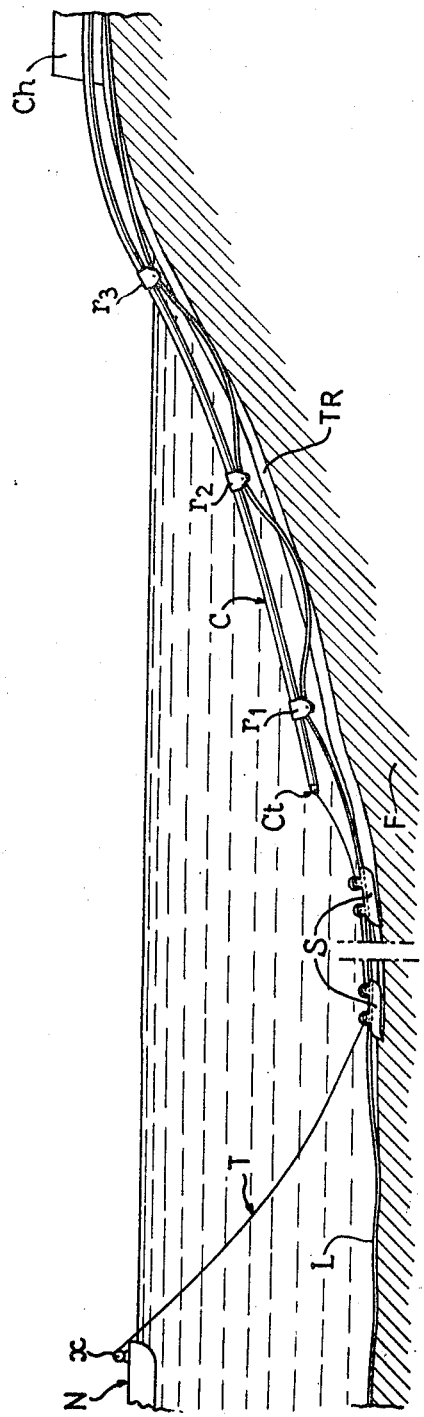

The object of the present invention is to reduce considerably the tractive force employed in conventional methods for drawing a conduit along the bed of the sea and to avoid any intervention other than the use of said force when laying the conduit.

The invention provides a method for laying submarine conduits comprising, causing a conduit having a certain buoyancy to progress in a continuous manner along a heavy cable previously laid on the sea bed, fixing in spaced relation on said conduit rolling devices which are located vertically below the axis of said conduit, interposing said cable between said devices and said conduit, and effecting a continuous traction on the head end of the conduit while fixing said devices and interposing said cable so that said conduit is guided by said cable while it is being laid.

Another object of the invention is to provide an immersed conduit comprising a number of rolling devices secured thereto in spaced relation to each other and located vertically below the axis of the conduit, and a cable trapped between said rolling devices and the conduit.

Further features and advantages of the invention will be apparent from the ensuing description with reference to the acccompanying drawings.

In the drawings:
FIG. 1 is a diagrammatic view showing the principle underlying the laying of a conduit in accordance with the invention;
FIG. 2 is a longitudinal elevational view of a portion of a conduit showing a rolling device, and
FIG. 3 is a cross-sectional view taken along line 3—3 of FIG. 2.

In the embodiment shown in FIG. 1, a cable or "laying line" L is disposed on the sea bed F. A conduit C, which is guided by the line L, is intended to be laid on the bed F by means of a ship or lighter N. For this purpose a number of rolling devices $r^1$, $r^2$, $r^3$ . . . are employed which are connected to the conduit C and guided by the line L (a traction cable T being secured to the head end $C_t$ of the conduit C. The traction cable is wound onto a winch $x$ on the ship N as the conduit C advances.

The "bed line" or cable L has a certain weight per unit length, for example 15 kg./metre, which is determined by the magnitude of the currents likely to be met with during the laying of the conduit C. This relatively high linear weight thus ensures the vertical and horizontal stability of the conduit.

FIGS. 2 and 3 show one embodiment of a rolling device secured to the conduit C and connected to the bed line L.

Such a rolling device comprises a clamping collar 1 which encompasses the conduit C on a part of its length. This collar comprises a split ring 2 the free ends of the latter being clamped together by bolts 3 which extend through flanges 2a, 2b for example.

Two lateral walls, 4 and 5, are welded to the collar so as to form a fork structure. A spindle 6 carrying a roller 7 is mounted in the walls 4 and 5. The roller has a radiused groove 8. The cross-sectional shape of this groove is adapted to suit the diameter of the line L. The latter extends between the conduit C and the roller 7.

Owing to the relative arrangement of the line L and rolling devices $r^1$, $r^2$, $r^3$ . . . and to the slight buoyancy of the conduit C, a regular runway is afforded which permits an easy and rapid advance of the conduit for a very reduced tractive force on the part of the cable T.

The usual tractive force, which is proportional to the product $fp$, namely the coefficient of friction on the bed multiplied by the apparent weight of the conduit C, is therefore reduced by replacing a frictional resistance on the bed by a rolling resistance on a cable and by replacing an apparent weight necessary for resisting the crosscurrents by a buoyancy of the conduit which is much less than the apparent weight.

The pipe is laid in the following manner:
The cable or line L having a weight of, for example, 15 kg./metre is laid on the sea bed in a rectilinear path and under suitable tension, which depends on the desired distance between the conduit and the bed. At the land end, this line is supplied from an unwinding reel (not shown in the drawing) exerting a constant tension. The opposite end of this cable is secured to the sea bed or to the land in a suitable manner and at a well-determined point.

On the land site $Ch$, the conduit is provided as it is fed forward with the rolling devices and the bottom line L is assembled therewith. It should be mentioned that the conduit has, upon laying, a certain buoyancy beyond a certain diameter of the conduit. This buoyancy could reach a value of 5 kg./metre for example.

Under the tractive force created by the winch $x$ on the ship N towing on the cable T, the conduit advances and the rollers 7 roll along the lower half surface of the line L. Owing to the slight buoyancy of the conduit C, the line L rises slightly upon the passage of the rolling devices $r^1$, $r^2$, $r^3$. . . .

In this way, the tractive force to be exerted is proportional to the product $wr$ of the buoyancy multiplied by the rolling resistance ($wr\doteq 5\times 0.02=0.1$ kg./m.$=0.1$ t./km.) whereas with the conventional method and for the same total apparent weight capable of resisting the same current ($15-5=10$ kg./metre) it would be necessary to exert a force which is proportional to the product $pf$ of the apparent weight of the conduit multiplied by the friction of the conduit on the bed ($pf=10\times 1=10$ kg./ metre$=10$ t./km.) The required force to exert is therefore divided by 100 in this example.

Further, while laying, the conduit is not placed on the bottom since its buoyancy raises a part of the bed line L. This method therefore permits to a large extent bridging the unevenness of the sea bed and advance the conduit without rubbing against any obstacle. The outer covering of the conduit therefore remains unharmed.

By means of this method the conduit is guided towards a point which is predetermined by placing one end of the bed line L in position and the conduit reaches said point with a perfect precision.

Furthermore, the tractive force is very low and the even runway afforded by the cable L permits laying very great lengths of conduit with a very high rate of laying (on the order of 1 km. per hour) without interruption and with a single ship out at sea. During the laying, no intervention is necessary other than the tractive force exerted by the ship N. In particular no systematic intervention on the part of frog men is required.

The utilization of this method can assume different forms, according to the cases:

(1) If it concerns laying on the sea bed a conduit having by its very nature a certain buoyancy (diameter >200 mm. and consisting of conventional steel tubes) intended to convey a liquid fluid, which is the most favourable case, no variable lightening is necessary. The introduction of the fluid causes the conduit to drop to the bed.

(2) If the conduit has a natural buoyancy but the fluid is too light to lay the conduit, the conduit can be left floating which gives rise to no problem, or it can be laid on the bed in which case the weight must be increased artifically.

(3) If conduit has a natural apparent weight, it must be artificially lightened during the laying by floats, which could be disposed in alignment with the rolling devices.

(4) If the length of conduit to be laid is very great, the laying could be effected in several elements on condition that the section of conduit the most remote from the construction site on the land (C$h$) is laid first of all. In this way, it is certain that the successive section of conduit will be correctly aligned for their welded assembly by means of a submarine device constructed for this purpose.

Although a specific embodiment of the invention has been described, many modifications and changes may be made therein without departing from the scope of the invention as defined in the appended claims.

Thus, the bed line L which is laid before the positioning of the conduit, could be a guide which facilitates the construction of a trench TR by the passage of scrapers which have a suitable shape and throw the material out on both sides of the trench in which the laying line L subsequently remains.

Having now described my invention what I claim as new and desire to secure by Letters Patent is:

1. A method for laying a conduit having buoyancy on a bed underlying a mass of water by means of a traction exerted on said conduit, said method comprising laying a relatively heavy cable on said bed, said cable having a rear part on an assembly site and a forward part remote from said assembly site and located at a point in the direction of which said conduit is intended to extend from said assembly site, fixing rolling devices on said conduit in spaced relation to each other, interposing said cable between said rolling devices and said conduit on said assembly site so that said devices can roll along said cable, and effecting a traction on the forward end of said conduit in the direction of said forward part of said cable so that said conduit is guided by said cable as it is being laid.

2. A method as claimed in claim 1, wherein said forward part of said cable is fixed in position before exerting said traction on said conduit, whereby said conduit is laid with precision.

3. A method as claimed in claim 1, wherein said rolling devices are fixed to said conduit one after the other and said cable is interposed between said rolling devices and said conduit as said conduit advances towards said forward part of said cable.

4. A method as claimed in claim 1, further comprising, before laying said conduit on said bed, causing a number of scrapers to travel along said cable so as to cut a trench in said bed to receive said conduit.

5. An immersed conduit comprising a plurality of rolling devices secured thereto in spaced relation to each other and located substantially vertically below the axis of said conduit, and a cable trapped between said rolling devices and said conduit.

6. A conduit as claimed in claim 5, wherein each rolling device comprises two spaced side walls secured to said conduit and a roller rotatably mounted between said side walls, said cable being trapped between said conduit and said rollers and said rollers being in rolling contact with the under side of said cable.

References Cited

UNITED STATES PATENTS

| Re. 23,963 | 3/1955 | Collins | 61—72.4 |
| 2,910,835 | 11/1959 | Timothy | 61—72.3 |
| 3,347,054 | 10/1967 | Sherrod | 61—72.4 |

FOREIGN PATENTS

| 483,754 | 10/1929 | Germany. |
| 922,919 | 4/1963 | Great Britain. |
| 920,720 | 3/1963 | Great Britain. |

EARL J. WITMER, *Primary Examiner.*